United States Patent Office 3,734,910
Patented May 22, 1973

---

3,734,910
CERTAIN DIAZINYLCARBOXAMIDOETHYL-BENZENESULFONYLUREAS
Vittorio Ambrogia, Willy Logemann, Marcantonio Parenti, and Raffaele Tommasini, Milan, Italy, assignors to Carlo Erba S.p.A., Milan, Italy
No Drawing. Filed Oct. 12, 1970, Ser. No. 80,142
Claims priority, application Italy, Oct. 13, 1969, 23,275/69, 23,276/69
Int. Cl. C07d 51/36, 51/04
U.S. Cl. 260—250 A    11 Claims

ABSTRACT OF THE DISCLOSURE

New acylamino-alkyl-benzenesulfonyl ureas and acylamino-alkylbenzenesulfonyl-semicarbazides and process for their preparation are disclosed, for example N-{4-[β-(2,6 - dimethoxy-pyrimidine - 4 - carboxamido)ethyl]benzenesulfonyl}-N'-cyclohexylurea. These compounds are useful for their hypoglycemic activity.

---

This invention relates to novel diazines and more particularly to new acylamino-alkyl-benzenesulfonyl-ureas and acylamino-alkyl-benzenesulfonyl-semicarbazides and a process for their preparation.

The compounds of the present invention have been found to exhibit hypoglycemic activity when administered orally in responsive cases of diabetes mellitus either alone or in combination with biguanide congeners, such as 1-phenethylbiguanide or N'-β-phenethylformamidinyliminourea (Phenformin) and its hydrochlorides. Heretofore oral diabetes mellitus therapy has been accomplished using oral hypoglycemic agents such as sulfonylureas (1 - butyl-3-p-polysulfonylurea and 1-propyl-3-p-chlorobenzenesulfonylurea) and the biguanides above. Administration, mechanism of action and therapeutic uses of these known compounds are described in Goodman & Gilman, The Pharmacological Basis of Therapeutics (1965).

The compounds of the present invention have the following general formula:

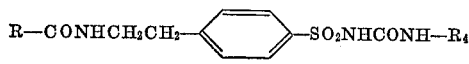

where R is:

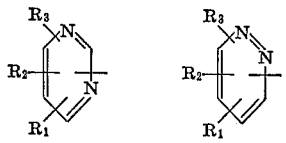

and $R_1$, $R_2$ and $R_3$ are each hydrogen, halogen, alkyl of 1 to 4 carbon atoms, lower alkoxy, preferably methoxy, hydroxyl or an amino group of the general formula:

wherein R' and R'' are each hydrogen or alkyl of 1 to 4 carbon atoms, or a phenyl group of the general formula:

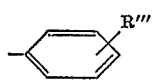

wherein R''' is hydrogen, halogen, alkyl of 1 to 4 carbon atoms, lower alkoxy, preferably methoxy and $R_4$ is:

(a) a lower alkyl of 1 to 8 carbon atoms,
(b) a lower alkene of 2 to 8 carbon atoms,
(c) a cycloalkyl group of 5 to 8 carbon atoms optionally substituted with a lower alkyl or lower alkene as above, a lower alkoxy, preferably methoxy,
(d) a cyclo-alkylene-imino radical of 3 to 7 carbon atoms optionally substituted with a lower alkyl of 1 to 4 carbon atoms or a lower alkoxy, preferably methoxy,
(e) a cyclo-alkylene-imino radical of 3-7 carbon atoms optionally substituted with a bicyclic radical containing an imino group,
(f) a bicyclic radical containing an imino group, optionally substituted with alkyl groups or alkoxy groups such as for instance:

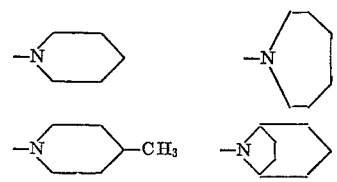

Acylaminoalkylbenzenesulfonylureas and acylaminoalkylbenzenesulfonylsemicarbazides of the present invention may be prepared by reaction of compounds of the general formula:

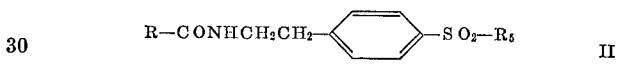

II where R has the meaning given above and $R_5$ may be halogen, amino, isocyanate, urethane or urea, with amines, ureas, isocyanates, esters of iminocarbamic acids containing the radical $R_4$ as described above or a hydrazine of the formula $R_4$—$NH_2$. The diazine radical (R—CO—) is introduced by acylation using, for example, the corresponding substituted acid halides, azides or via mixed carboxylic-carbonic anhydrides.

The compounds of Formula II can be prepared by methods taken from the literature.

As regards the reaction conditions, the embodiments of the process of the present invention may, in general, vary within wide limits and may be adapted to each individual case. For example, the reaction can be effected with the use of solvents, at room temperature or at an elevated temperature.

Another method of preparing the compounds of the sulfonylureas of the present invention is by reacting a carboxylic acid substituted pyrimidine or pyridazine corresponding to R such as for example, 2,6-dimethoxypyrimidine-4-carboxylic acid prepared hydrolyzing with 2 N NaOH methyl-2,6-dimethoxy-4-pyrimidine carboxylate obtained as described by Gershon H., J. Org. Chem. 27, 3507 (1962), the disclosure of which is hereby incorporated by reference, with an amine, for instance p-(β-aminoethyl) benzenesulfonamide prepared according to Miller E., Sprague J., Kissinger L. W. and Mc. Burney L. F., J. Am. Chem. Soc. 62, 2099 (1950), the disclosure of which is hereby incorporated by reference. According to this process the substituted carboxylic acid is dissolved in a solvent inert to the reactants, such as acetone, benzene, dioxane, turned into the acid halide or the mixed carboxylic-carbonic anhydride which is subsequently reacted with the benzene-sulfonamide. The solvent is removed from the crude product by distillation and the crude product filtered and recrystallized. The resulting product is suspended in a solvent containing hydroxide ions to which is added a cycloalkyl isocyanate such as cyclohexylisocyanate, and the suspension cooled to about 0 to 5° C. and agitated at room temperature for about 1 to 8 hours, then purified and recovered. The above procedures are conducted at atmospheric pressure, however, higher and lower pressures may be used.

The resulting compound may be converted to a pharmaceutically acceptable salt by treatment with alkaline agents or with physiologically tolerable acids. Examples of pharmaceutically acceptable salts are those derived from mineral acids such as hydrochloric acid, phosphoric acid, sulfamic acid, and sulfuric acid; and organic acids such as acetic acid, citric acid, tartaric acid, lactic acid, ascorbic acid, methane-sulfonic acid, ethanesulfonic acid, quinic acid, 3-hydroxy-2-naphthoic acid, naponic acid (1,5-naphthalenedisulfonic acid), acetylsalicylic acid, salicylic acid, mucic acid, muconic acid, and the like, giving the hydrochloride, phosphate, sulfamate, sulfate, acetate, citrate, tartrate, lactate, ascorbate, methanesulfonate ethanesulfonate, quinate, 3-hydroxy-2-naphthoate, naponate, acetylsalicylate, salicylate, mucate, and muconate, respectively.

The compounds of the present invention are useful both in free form and in acid or basic addition salt form. Both forms are within the purview of the invention, and are considered to be one and the same invention. The acid or basic addition salts are simply a usually more convenient form for use.

The acid addition salts are prepared preferably by reacting the free base and acid in an organic solvent, e.g., ethanol, acetone, dimethylformamide, etc., in which case the salt separates directly or can be obtained by concentration of the solution.

Although pharmaceutically-acceptable salts are preferred, all acid and basic addition salts are within the scope of our invention. All acid and basic addition salts are useful as sources of the free form even if the particular salt per se is not desired as the final product, as for example when the salt is formed for purposes of purification or identification, or when it is used as an intermediate in preparing a pharmaceutically acceptable salt.

PHARMACOLOGICAL STUDIES

Pharmacological activity of the compounds of the present invention in the treatment of diabetes mellitus was investigated by screening method based on depression of blood sugar values in intact animals (William E. Dulin in Animal and Clinical Pharmacologic Techniques in Drug evaluation—Year Book Med. Publ. 1964; August Loubatieres in Evaluation of Drug Activities: Pharmacometrics—Acad. Press. N.Y. 1964). The method is derived from U.S.P. rabbit assy. of insulin products and is a modification of method described by Hökfelt and Jönsson (J. Med. Pharm. Chem. 5, 231, 1962) in a study of large number of sulfonylureas. In this study New Zealand white rabbits weighing 2.5 to 3.0 kg. were fasted for a period of 16 hours. For each compound tested three groups of six animals each were used. The compounds were administered per os suspended in 0.5 ml. Methocel 400 in a volume of 0.5 ml./kg. Group I received compound at dose of 1.5 mg./kg. Group II received compound at dose of 0.3 mg./kg., while Group III, the control group, received only suspendent. Blood samples were taken from the animals of all three groups before administration of the drug, at 3 hours after administration of the respective compounds and again 6 hours thereafter. The samples were measured for blood glucose content according to the method of o-toluidine (K. N. Dubowsky-Clin. Chem. 8, 215, 1967). The results are given in Tables I and II as percent lowering of blood glucose as calculated against levels measured prior to administration of the compound.

TABLE I

Administration of N-{4-[β-(2,6-dimethoxy-pyrimidine-4-carboxamido)ethyl]benzenesulfonyl} - N' - cyclohexylurea, percent lowering of blood glucose relative to pretreatment levels

TABLE I

| Group | Dose (mg./kg.) | Percent at— | |
|---|---|---|---|
| | | [1] 3 | [1] 6 |
| I | 1.5 | 45 | 54 |
| II | 0.3 | 32 | 50 |
| III | 0 | 1 | 3 |

[1] Hours after administration.

TABLE II

Administration of N-{4-[β-(pyridazine - 3 - carboxamido)ethyl]benzenesulfonyl} - N' - cyclohexylurea, percent lowering of blood glucose levels relative to pretreatment levels

TABLE II

| Group | Dose (mg./kg.) | Percent at— | |
|---|---|---|---|
| | | [1] 3 | [1] 6 |
| I | 1.5 | 48 | 57 |
| II | 0.3 | 33 | 52 |
| III | 0 | 2 | 2 |

[1] Hours after administration.

A significant lowering of blood glucose levels will be readily observed from the above tables. Moreover, these levels were achieved using an effective dose of only a few milligrams, indicating a high degree of activity of the compounds of the invention.

The compounds of the present invention can be conveniently incorporated with pharmaceutical carriers or diluents such as, for instance, gelatine capsules; microcrystalline cellulose; lactose; natural gums; starches, such as corn starch and potato starch; cellulose derivatives, such as sodium carboxymethyl cellulose, ethyl cellulose, methyl cellulose, cellulose acetate phthalate; gelatin; talc; stearic acid; magnesium stearate; as well as other non-toxic compatible substances used in pharmaceutical formulations.

The following working examples illustrate but in no manner limit the scope of the present invention. Unless otherwise started, all parts and percentages are by weight.

EXAMPLE OF THE INVENTION

Example 1

2,6-dimethoxypyrimidine - 4 - carboxylic acid (4.84 g.) is dissolved in anhydrous acetone (50 ml.) and triethylamine (365 ml.). The solution is agitated for 15 minutes at 0° C., then it is treated dropwise with 2.5 ml. of ethyl chloroformate (2.5 ml.) with agitation for 30 minutes and cooling to minus 5° C. At this point a solution of p-(β-aminoethyl)benzenesulfonamide (5.21) in water (50 ml.) and triethylamine (365 ml.) is added at one time. The mixture is agitated for 3 hours at room temperature. The acetone is then removed by distillation and the mixture is acidified with diluted hydrochloric acid (20 ml., 2 N), and the crude product that separates is filtered out and recrystallized from ethanol (250 ml.). Yield: 6.6 g.; M.P. 187–189° C.

6.6 g. of this reaction product is suspended in a mixture of acetone (100 ml.) and sodium hydroxide solution (9.84 ml., 2 N); cyclohexylisocyanate (2.45 g.) is added dropwise to this suspension and cooled to between 0 and 5° C. The mixture is agitated for 3 hours at room temperature, diluted with water (300 ml.), filtered to eliminate undissolved products, and the filtrate acidified with diluted hydrochloric acid (5 ml.). The precipitate N - {4 - [β - (2,6 - dimethoxypyrimidine - 4 - carboxamido)ethyl]benzenesulfonyl} - N' - cyclohexylurea, is recrystallized from ethanol (30 ml.). The M.P. 192–194° C., yield 7.1 g.

Example 2

In the same manner as described in Example 1 above, starting from 6-methylpyrimidine - 4 - carboxylic acid, the product N - {4 - [β(6 - methylpyrimidine - 4 - carboxamido)ethyl]benzenesulfonyl} - N' - cyclohexylurea was recrystallized from ethanol, representing a yield of 4.3 g. and having a melting point of 163° C.

Example 3

N-{4 - [β - (2 - methoxypyrimidine - 4 - carboxamido)ethyl]benzenesulfonyl}methylurethane (7.89 g.) is dissolved in methanol (150 ml.); N-amino-hexamethyleneimine (2.5 g.) is added. The methanol is removed by distillation at 35° C. under reduced pressure of 20 mm. Hg, and the residue is then heated to 110–120° C. for 30 minutes. The N-{4 - [β-(2 - methoxypyrimidine-4-carboxamido)ethyl]benzenesulfonyl} - N' - (perhydroazepin-1-yl)-urea, thus obtained is recrystallized from methanol (15 ml.).

Example 4

6-chloropyridazine - 3 - carboxylic acid (3.16 g.) is refluxed with thionyl chloride (2.2 ml.) in anhydrous benzene (25 ml.) for 4 hours at 100° C. The benzene and excess thionyl chloride are removed by distillation. The residue is redissolved with anhydrous dioxane (20 ml.). The solution of the acid chloride is transferred dropwise into a suspension of p-(β-aminoethyl)benzene sulfonamide (4 g.) in dioxane (50 ml.) and of anhydrous pyridine (3.74 ml.). The mixture is refluxed at 120° C. for 2 hours. Then the dioxane is removed by distillation at 50° C. under reduced pressure of 20 mm. Hg; the residue is acidified with diluted solution of hydrochloric acid (40 ml., 2 N) the crude acylated sulfonamide is filtered and crystallized from ethanol (120 ml., 95%) Yield: 3 g.; M.P. 210° C.

1.6 g. of this product is suspended in a mixture of sodium hydroxide solution (3.7 ml., 2 N) and acetone (50 ml.); cyclohexylisocyanate (0.89 g.) is added dropwise to this suspension at a temperature between 0 and 5° C. The mixture is agitated for 3 hours at room temperature, diluted with water (150 ml.) and freed of undissolved products by filtration; the filtrate is acidified with diluted hydrochloric acid (5 ml.). The product N-{4-[β-(6 - chloropyridazine - 3 - carboxamido)ethyl]benzenesulfonyl} - N' - cyclohexylurea, thus separated, is recrystallized from dioxane (10 ml.).

Example 5

6-methoxypyridazine - 3 - carboxylic acid (4.05 g.) is dissolved in anhydrous acetone (50 ml.) and triethylamine (3.65 ml.). The solution is agitated for 15 minutes at 0° C.; then it is treated dropwise with ethyl chloroformate (2.5 ml.) with agitation for 30 minutes at minus 5° C.

At this point, solution of p-(β-aminoethyl)benzenesulfonamide (5.21 g.) in water (50 ml.) and tirethylamine (3.65 ml.) is added at one time. The mixture is agitated for 3 hours at room temperature; the acetone is then removed by distillation at 40° C. under reduced pressure of 20 mm. Hg and the residue is acidified with diluted hydrochloric acid (20 ml.). The separated product is filtered and crystallized from methanol (200 ml.). Yield: 7.1 g.; M.P. 207° C. 6.6 g. of this product, treated as in Example 1 with acetone (100 ml.), sodium hydroxide solution (9.84 ml., 2 N) and cyclohexylisocyanate (2.45 g.), isolated and crystallized from ethanol (25 ml.), give N - {4 - [β - (6 - methoxypyridazine - 3 - carboxamido)ethyl]benzenesulfonyl} - N' - cyclohexylurea; Yield: 4.6 g., M.P. 193–195° C.

Example 6

The procedure of Example 5 is repeated substituting pyridazine-3-carboxylic acid for the 6-methoxypyridazine-3-carboxylic acid. N-{4 - [β-(pyridazine-3-carboxamido)ethyl]benzenesulfonyl}-N' - cyclohexylurea was obtained after recrystallization from ethanol. Yield: 3.8 g., M.P. 191–193° C.

Example 7

N-{4-[β-(pyridazine-3-carboxamido)ethyl]benzenesulfonyl}methyl urethane (7.3 g.) is dissolved in methanol (150 ml.); N-amino hexamethylene imine (2.5 g.) is added. The methanol is removed by distillation at 35° C. under reduced pressure of 20 mm. Hg., and the residue is heated to 110–120° C. for 30 minutes. The resulting N-N{4-[β-(pyridazine - 3 - carboxamido)ethyl]benzensulfonyl}-N'-(perhydroazepin-1-yl)-urea is recrystallized from methanol (20 ml.).

What is claimed is:

1. A compound having the general formula:

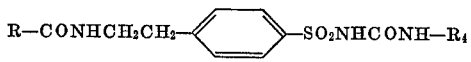

wherein R is:

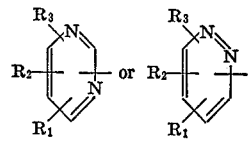

wherein $R_1$, $R_2$ and $R_3$ are independently selected from the group consisting of hydrogen, halogen, alkyl of 1 to 4 carbon atoms, lower alkoxy of 1 to 4 carbon atoms, hydroxyl, an amino group of the general formula:

wherein R' and R" are independently selected from the group consisting of hydrogen, alkyl of 1 to 4 carbon atoms, and a phenyl group of the general formula:

wherein R''' is selected from the group consisting of hydrogen, halogen, alkyl of 1 to 4 carbon atoms, lower alkoxy of 1 to 4 carbon atoms, and $R_4$ is selected from the group consisting of:
  (a) a lower alkyl of 1 to 8 carbon atoms,
  (b) a lower alkene of 2 to 8 carbon atoms,
  (c) a cycloalkyl group of 5 to 8 carbon atoms optionally substituted with a lower alkyl or lower alkene as above, a lower alkoxy of 1 to 4 carbon atoms,
  (d) a cyclo-alkylene-imino radical of 3 to 7 carbon atoms optionally substituted with a lower alkyl of 1 to 4 carbon atoms or a lower alkoxy of 1 to 4 carbon atoms.

2. The compound as claimed in claim 1 wherein R is

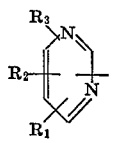

and $R_1$ is a hydrogen and $R_2$ and $R_3$ are lower alkyl of 1 to 4 carbon atoms, lower alkoxy of 1 to 4 carbon atoms, or hydrogen and $R_4$ is a cyclohexyl or perhydroazepin-1-yl group.

3. The compound as claimed in claim 1 wherein R is

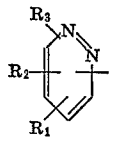

and $R_1$ is a hydrogen and $R_2$ and $R_3$ are hydrogen, halogen or lower alkoxy of 1 to 4 carbon atoms and $R_4$ is a cyclohexyl or perhydroazepin-1-yl group.

4. The compound N-{4-[β-(2,6-dimethoxypyrimidine-4-carboxamido)ethyl]benzenesulfonyl} - N' - cyclohexylurea as claimed in claim 1.

5. The compound N-{4-[6-methylpyrimidine-4-carboxamido)ethyl]benzenesulfonyl} - N' - cyclohexylurea as claimed in claim 1.

6. The compound as claimed in claim 1 wherein said compound is N-{4-[β-(2 - methoxypyrimidine-4-carboxamido)ethyl]benzenesulfonyl}-N'-(perhydroazepin-1-yl)-urea.

7. N-{4-[β - (6 - chloropyridazine-3-carboxamido)ethyl]benzenesulfonyl} - N' - cyclohexylurea, as claimed in claim 1.

8. N-{4-[β-(6-methoxypyridazine - 3 - carboxamido)ethyl]benzenesulfonyl}-N'-cyclohexylurea, as claimed in claim 1.

9. N-{4-[β-(pyridazine - 3 - carboxamido)ethyl]benzenesulfonyl}-N'-cyclohexylurea, as claimed in claim 1.

10. Compound as claimed in claim 1, wherein said compound is N-{4-[β-(pyridazine-3-carboxamido)ethyl]-benzenesulfonyl}-N'-(perhydroazepin-1-yl)-urea.

11. Compound of claim 1, wherein said lower alkoxy of 1–4 carbon atoms is methoxy.

References Cited

UNITED STATES PATENTS

| | | | |
|---|---|---|---|
| 2,816,892 | 12/1957 | Young et al. | 260—250 A |
| 3,102,115 | 8/1963 | Breuer et al. | 260—256.5 R |

OTHER REFERENCES

Wagner et al., Synthetic Organic Chemistry, Wiley, New York, 1953, pp. 566–645.

ALEX MAZEL, Primary Examiner

R. J. GALLAGHER, Primary Examiner

U.S. Cl. X.R.

260—256.5 R, 200, 232; 424—250, 251